Oct. 13, 1931.  C. TAMA  1,827,174
METHOD OF MELTING OXIDIZABLE MATERIAL
Filed June 10, 1929
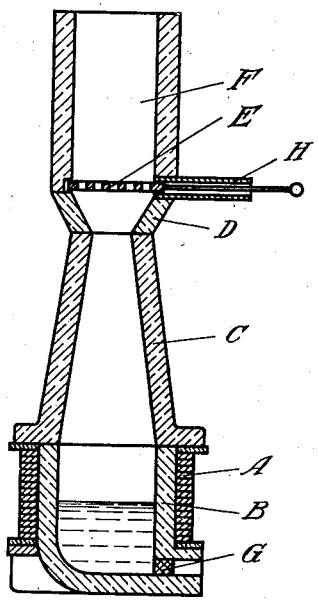
Inventor:
Cyrano Tama, Patented Oct. 13, 1931

1,827,174

UNITED STATES PATENT OFFICE

CYRANO TAMA, OF EBERSWALDE, GERMANY, ASSIGNOR TO FIRM: HIRSCH, KUPFER- AND MESSINGWERKE, A. G., OF FINOW/MARK, GERMANY

METHOD OF MELTING OXIDIZABLE MATERIAL

Application filed June 10, 1929, Serial No. 369,653, and in Germany June 16, 1928.

My invention relates to a method of melting oxidizable material, especially of melting oxidizable material in small pieces, like wastemetal.

It is known to prevent the oxidation of such material before and during the melting process by various reducing agents, e. g. by a sooting blaze or by inert gases. However, these methods require particular accessory parts, are expensive in work and not always reliable.

One object of the invention is to prevent the oxidation of the melting material without any special means in an entirely reliable manner.

Another object is to provide an apparatus for carrying out the method according to the invention.

The invention bases on the fact, that from the melting bath metal vapours escape which may be used for preventing the oxidation of the melting material. The method according to the invention consists in leading the metal vapours escaping from the melting bath through the melting material during the whole melting process so that the melting of the material is effectuated in this non-oxidizing vapour atmosphere. Thereby the oxygen of the air cannot come into contact with the heated melting material and its oxidation is completely prevented in the most simple way.

In the accompanying drawing there is illustrated an apparatus for carrying out the invention.

The crucible B of refractory material is surrounded by an induction coil A. Above the crucible a conical part C is provided through which the melting material gets inserted into the crucible. The part C carries a funnel D and a preheating or condensing room F having a cylindrical form. Between the funnel D and the room F a perforated plate E is provided the openings of which are to be shut by the sliding lid H. G is the tap hole of the furnace.

The method of operation is as follows:

First the crucible and the room C get charged with melting material, e. g. brasschips. Then the plate E will be shut by the sliding lid H, the charge melted by induction current and the next charge inserted into the preheated room F. Now the lid H gets drawn out so the vapour escaping from the melting bath penetrates through the chips in the room F. The chips become heated by heat radiation from the melting bath as well as by the hot vapours and are melting by and by in the non-oxidizing atmosphere of the metal-vapours. As the chips take some oxygen with them, the production of a little zinc-oxide cannot be prevented. This zinc-oxide appears as the whole waste which is to be eliminated by any known means, e. g. by mixing up the chips with a certain amount of pulverized coal. Practically any waste of zinc is avoided and it has been found indeed that the melting of brass-chips with this method was effectuated with an output of 98–99% which result could not be reached by any known method up to the present time.

The irrigation of the charge with the metal vapours has the further advantage of preheating the charge which is of great importance, especially with continuous working.

In order to increase the reliability of service an iron pipe leading into free air and closed by a safety-valve may be provided in the room C for letting out the excess of zinc-vapour in case of overheating the melting bath and too strong production of zinc-vapour caused thereby.

It is to be well understood that the invention is not restricted to the melting of brasschips but relates to the melting of any material containing vaporizable components. The melting process may also be effectuated in any melting furnace besides induction furnaces.

Having now described and ascertained the nature of my invention and in what manner the same is to be performed, what I claim is:

1. In an apparatus for melting oxidizable material, in combination, a melting pot, means for heating said melting pot, a preheating chamber arranged above said melting pot and connected to it by a funnel of refractory material and a perforated plate provided between the melting pot and the preheating chamber, the perforated plate being adapted to be removed and provided with means for closing the openings of said plate.

2. In an apparatus for melting oxidizable material, in combination, a crucible, an induction coil surrounding said crucible, a preheating chamber arranged above said crucible and connected to it by a funnel of refractory material, a perforated plate between the crucible and the preheating chamber, said perforated plate being adapted to be removed and provided with means for closing its openings.

3. A method for preventing the oxidation of oxidizable metals and melting the same, which consists in leading metal vapors from a molten bath of said oxidizable metals through the metal to be melted to melt said metals and to exclude air.

4. A method for preventing the oxidation of oxidizable metals and melting the same, which consists in melting a first charge of oxidizable metal, and melting succeeding charges of said metal while directing the metal vapors of the previously melted metal through said succeeding charges to melt the same and to exclude air.

In testimony whereof I affix my signature.

CYRANO TAMA.